June 21, 1960 W. C. DEAN 2,942,195

ELECTRICAL FILTER CIRCUITS

Filed May 15, 1958 4 Sheets-Sheet 1

INVENTOR.
WILLIAM C. DEAN
BY
[signature]

June 21, 1960 W. C. DEAN 2,942,195

ELECTRICAL FILTER CIRCUITS

Filed May 15, 1958

4 Sheets-Sheet 2

INVENTOR.
WILLIAM C. DEAN

BY

June 21, 1960 W. C. DEAN 2,942,195

ELECTRICAL FILTER CIRCUITS

Filed May 15, 1958 4 Sheets-Sheet 3

INVENTOR.
WILLIAM C. DEAN

BY

June 21, 1960 W. C. DEAN 2,942,195

ELECTRICAL FILTER CIRCUITS

Filed May 15, 1958 4 Sheets-Sheet 4

INVENTOR.

WILLIAM C. DEAN

BY

United States Patent Office 2,942,195

Patented June 21, 1960

2,942,195

ELECTRICAL FILTER CIRCUITS

William C. Dean, Indiana Township, Allegheny County, Pa., assignor to Gulf Research & Development Company, Pittsburgh, Pa., a corporation of Delaware Filed May 15, 1958, Ser. No. 735,458

6 Claims. (Cl. 328—138)

This invention relates to electrical filter circuits and in particular relates to a filter circuit comprising an electrical network system whose response to an impulse may be made to have any desired impulse response and which network is amenable to computation and whose physical parameters may be accomplished with accuracy. The filter system of this invention is particularly advantageous in the determination of optimum characteristics required of a seismograph when the seismograph is required to effect maximum signal-to-noise ratio.

In reflection seismograph prospecting operations it has been customary to electrically effect certain changes in the seismograph signal in order to increase the ratio of reflected seismic signal to noise. Common devices for doing this are, for example, band-pass filter circuits having a known steady-state frequency response characteristic and the purpose of these filters is to attenuate the predominating noise frequencies as compared to the frequencies of the useful seismic signal. However, seismic impulses are transient in character and it is often advantageous to examine the transient response characteristic of seismograph filters. Such an analysis is herein termed "time-domain" filtering and the filters are herein termed "time-domain" filters.

It is possible with time-domain filters to obtain filter characteristics that are not attainable with conventional band-pass filters. For example, time-domain filters can be made to perform integrations, differentiations, or have irregular pass characteristics that cannot be accomplished with ordinary band-pass filters. Accordingly much more effective filtering is attainable by the use of time-domain filters. The signal-to-noise ratio may be improved by the use of time-domain filters having certain characteristic responses to transient impulses. Filters of this type are characterized in having a specified response to a known elementary form of input, for example the well-known step function. The present invention relates to time-domain filters of this general type.

Time-domain filters have heretofore been approximated by means of time-delay filters and the latter have been employed in the analysis of seismograms. Such time-delay filters employ multiple magnetic reproducing heads to play back a magnetically-recorded seismogram with adjustable delay times, the reproductions being combined in various ways. This system, however, is very expensive and cumbersome because of the many reproducing heads required. Furthermore it is susceptible to error in that the delay times must be small and are difficult to physically set up with accuracy. Furthermore the high frequency response of such a system cannot be specified beyond some given finite frequency.

One of the difficulties of constructing electrical filters lies in the difficulty of computing desirable or required characteristics which are prescribed by the particular type of signal and noise encountered in any particular seismic operation. A highly desirable sesismic filter is one whose characteristics are readily adjusted in such manner that the response is amenable to computation and which at the same time can readily be set up in a physical form closely approximating that required by the computations which are usually based on the use of ideal components. By an ideal component is meant an inductance without resistance or other losses, a capacity without losses, and a resistor without distributed capacity or inductance.

One way in which time-domain filters may be set up is disclosed in U.S. Patents Nos. 2,024,900; 2,124,599; and 2,128,257 to Wiener and Lee. These patents teach the use of an extended electrical network of a repetitive character called a symmetrical lattice network. These patents also teach sampling the signal at corresponding points along the lattice network, i.e. after the signal has traversed various numbers of lattice sections. The various signal samples are then adjusted to desired amplitude and polarity and combined in order to produce an output. By this means it is possible to obtain a filter whose output approximates any desired transient response by merely adjusting the polarity and amplitude of the signal samples that are combined.

A serious difficulty arises in physically setting up any extended lattice network of the type disclosed in the above-mentioned patents in that the theory disclosed in the patents requires the use of ideal inductances and condensers. Such networks are difficult to set up and if physical components are used that include losses, either the exact theoretical computations become cumbersome and inaccurate, or the actual behavior of the physical system poorly approximates the desired computed behavior. A further difficulty arises with the lattice networks of the above-mentioned patents in that most of the lattice sections are above ground potential giving rise to distributed-capacity effects, leakage to ground, and instability that is undesirable.

This invention provides electrical networks of the ladder type (as contrasted to lattice-type network) and combines the ladder with other components in such manner that the transient response resulting from a combined sampling at successive points of the ladder network as well as at the other components is readily computable with precision. The ladder and other networks employed in this invention have the further characteristic that the components need not be ideal, so that losses in the inductances and losses in the condensers do not seriously affect the result. Furthermore the circuits of this invention have the physically highly-desirable characteristic that one side of the network may employ a running ground which materially enhances stability, convenience of construction, reduces the number of components required and substantially reduces the effects of distributed capacity to ground.

Reference will be made to the drawings forming a part of this specification and in which.

Figure 9:
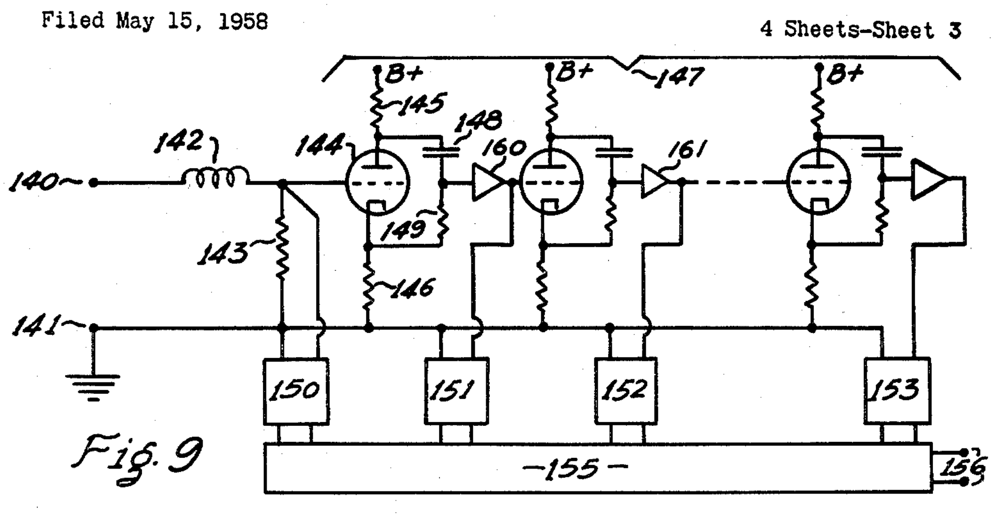
Figure 10:
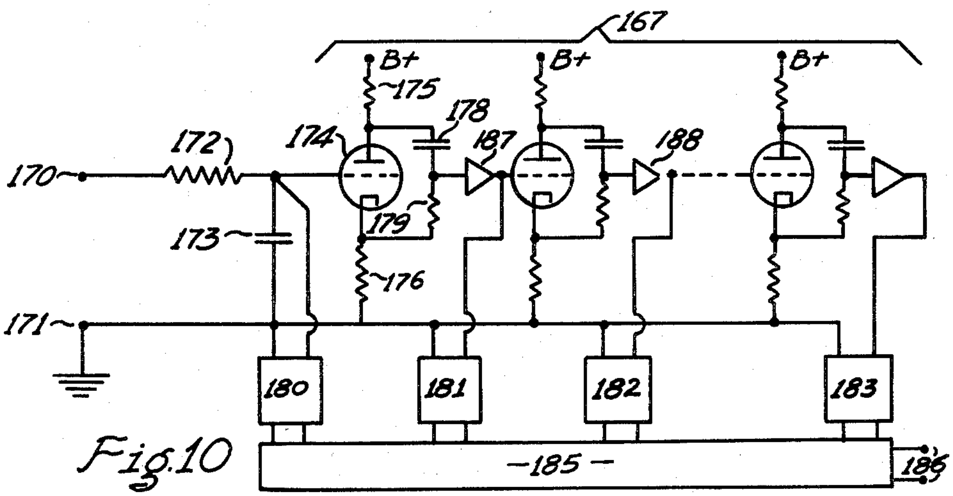
Figure 12:
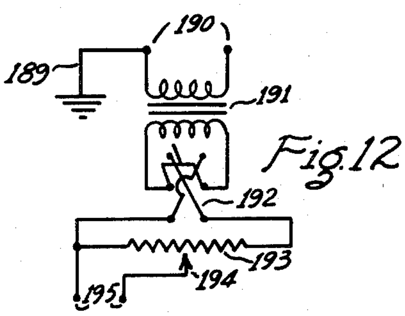
Figure 13:
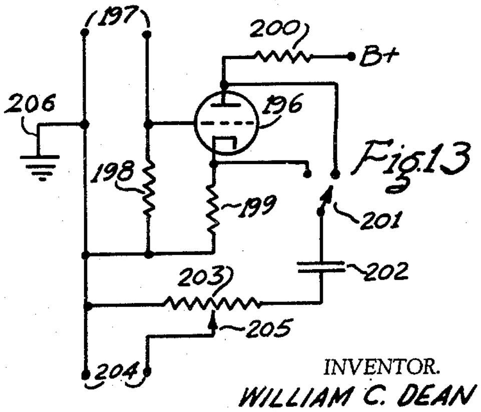
Figure 11:
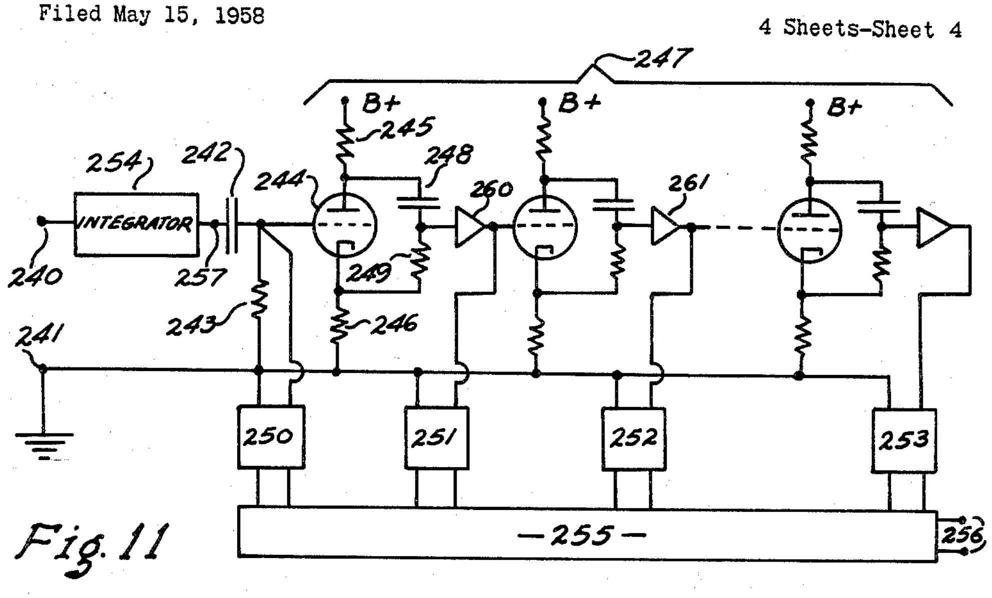
Figure 14:
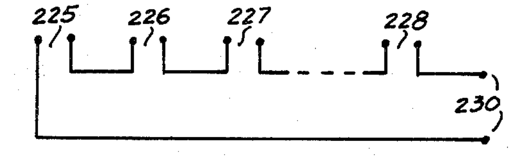
Figure 15:
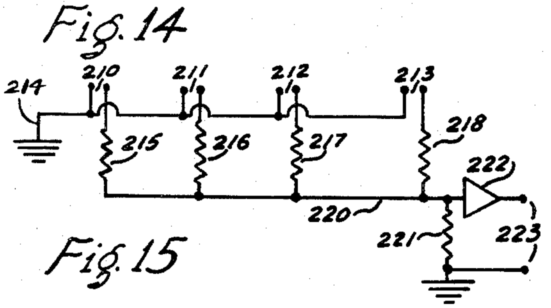
Figure 17:
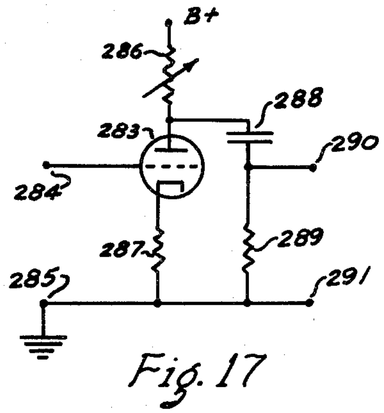
Figure 16:
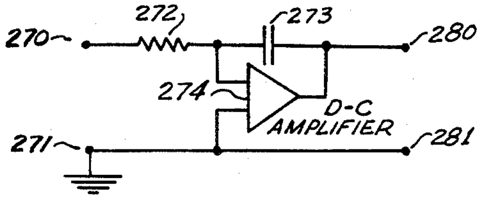

Figures 6, 7, 8, 9, 10, and 11 show detailed wiring diagrams of networks employed in this invention;

Figures 12 and 13 show detailed wiring diagrams of sampling circuits which may be employed in this invention;

Figures 14 and 15 show detailed wiring diagrams of summing circuits which may be employed in this invention;

Figure 16 shows a detailed wiring diagram of an integrator employed in the network of Figure 11; and Figure 17 shows a detailed wiring diagram of an amplifier employed in the network of Figures 9, 10, and 11.

Figure 1:
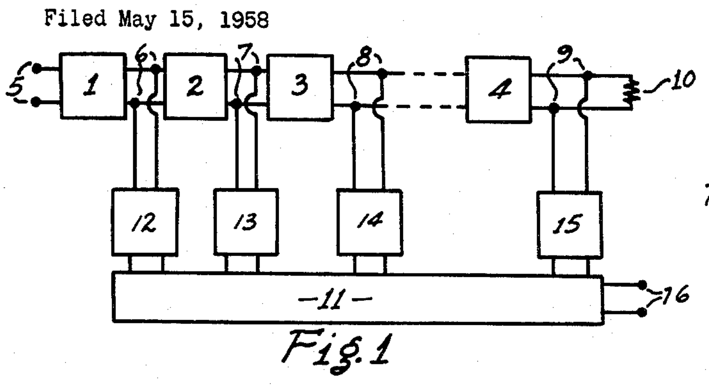
Figure 1 shows a generalized block diagram of the circuit described in the prior art and which employs a symmetrical lattice network illustrated in Figure 1(*a*)
Figure 1A:
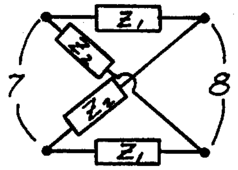

Referring to Figure 1 there is indicated an extended lattice network whose respective sections are indicated by 1, 2, 3, etc. 4. The respective sections are connected in succession as shown with the input to section 1 applied at terminals 5. Section 1 delivers its output to section 2 at terminals 6. Section 2 delivers its output to section 3 at terminals 7, and so on. It is understood that between the sections 3 and 4 of Figure 1 there may be interposed many similar sections. The output of the last section 4 is connected to an appropriate terminating resistor 10. In the aforementioned Patent 2,024,900 such a network is employed and the signal is sampled at points 6, 7, 8, etc. 9, and these samples are combined to form the output of the system which is delivered at terminals 16. The signal obtained from terminals 6, 7, 8, etc. 9 are adjusted as to polarity and amplitude by means of sampling circuits 12, 13, 14, etc. 15 whose outputs are algebraically combined by a summing circuit 11 whose output is delivered to the output terminals 16. In the above-mentioned prior-art patents the networks forming the sections 1, 2, 3, etc. 4 are symmetrical lattice sections, a lattice being characterized by having a shunt impedance which bridges a series impedance of the same section. In the symmetrical lattice sections disclosed in said Patent 2,024,900 the series impedances $Z_1$ are equal as shown in Figure 1(*a*), and the shunt impedances $Z_2$ are also equal as shown in Figure 1(*a*). There are no grounds on the respective lattice sections as the presence of more than one ground would obviously very materially change the circuit relationships. This results in the aforementioned difficulties which become particularly troublesome when one attempts to apply the system disclosed in the prior art to low-frequency operation such as is encountered in seismic prospecting operations.

Figure 2:
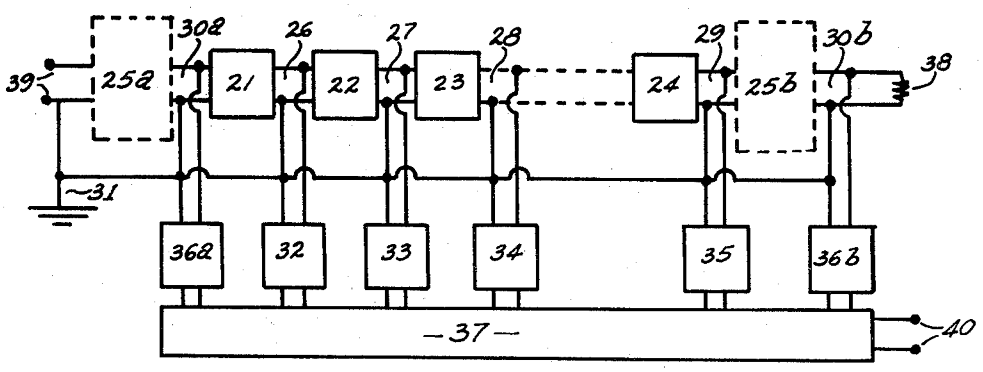
Figure 2 shows a generalized block diagram of the circuits of this invention and which employ a ladder network illustrated in Figure 2(*a*)
Figure 2A:
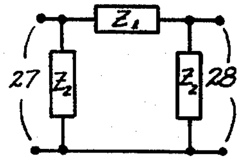

The present invention employs a ladder network in combination with at least one auxiliary network of the proper form. A typical ladder section employed in this invention is illustrated in Figure 2(*a*). In the invention the outputs from the respective sections of the ladder as well as the output from the auxiliary network are sampled and combined to form the system output. The invention provides specific combinations of particular types of ladder networks with a particular auxiliary network. In some embodiments the auxiliary network precedes the ladder, and in some embodiments the auxiliary network follows the ladder. All embodiments of the invention are characterized in that the particular ladder network used may have a running ground whereby the various elements of the ladder sections are always operated at the lowest practical potential above ground, thus minimizing the effects of distributed capacity in the ladder elements. In those embodiments which employ inductances substantially all of the inductances may be resistive, i.e. the inductances have series-connected resistors which may take into account the loss component of the coils employed as inductances. The preferred embodiment employs only resistors and condensers and completely avoids the use of inductances.

Figure 2 illustrates in block diagram form the schematic wiring of this invention. The ladder network, one section of which is illustrated in Figure 2(*a*), comprises sections 21, 22, 23, etc. 24 which must be of a particular type to be specifically described later. In the ladder section shown in Figure 2(*a*) the impedances $Z_2$ are equal and such a section is commonly termed a $\pi$ section. Auxiliary network 25(*a*) or 25(*b*), which must also be of particular type to be described, is connected either preceding the ladder network as is for example 25(*a*), or connected following the ladder network as is for example 25(*b*). The voltage at the section junctions 26, 27, 28, etc. 29 are sampled and adjusted as to known polarity and magnitude by the calibrated sampling circuits 32, 33, 34, etc. 35. If a preceding auxiliary network 25(*a*) is employed then the voltage at its output 30(*a*) is also sampled and this sample is adjusted as to known polarity and magnitude by means of sampling network 36(*a*), and if a following auxiliary network 25(*b*) is employed then the voltage at its output 30(*b*) is sampled and this sample is adjusted as to known polarity and magnitude by the sampling network 36(*b*). A terminating resistor 38 is connected to the last section whether it be the last ladder section or the end of the following auxiliary network. By employing one of the particular networks 25(*a*) or 25(*b*) herein described in combination with one of the particular ladder networks 21, 22, 23, etc. 24 herein described, it is possible to operate with a ground on one side of the system, i.e. at one of the input terminals 39 and one of the terminals 26, 27, 28, etc. 29, 30(*a*) or 30(*b*) as shown by the ground connection 31. The ground connection 31 also grounds one input terminal of each sampling circuit 32, 33, 34, etc. 35, and 36(*a*) or 36(*b*). The outputs of the sampling circuits 32, 33, 34, etc. 35, and 36(*a*) or 36(*b*) are algebraically combined by the summing circuit 37 whose output is delivered to terminals 40. The circuits 32–36 are known and will be described briefly later. They are all calibrated so that their respective adjustments may be read off their respective dial settings.

Figure 3:
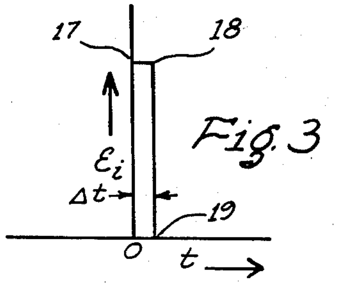
Figure 3 shows a graph of a typical impulse type of input signal.

It is convenient to consider the response at terminals 40 of the circuit of Figure 2 when a standard type of input is applied to the input terminals 39. One such type of input is the well-known step function in which the input voltage ($e$) is zero until time $t=0$ and thereafter $e$=constant, usually made unity. However, for purposes of the present invention it is preferred to employ an impulse type of voltage input such as shown in Figure 3. Whenever an impulse of the type illustrated in Figure 3 is applied to the input of the circuit of Figure 2 it will produce a decaying transient output. Figure 3 shows a plot of the input voltage applied to terminals 39 of Figure 2. The voltage is zero until the time zero, whereupon the voltage suddenly attains a value ($e_1$) indicated at 17 for a very short instant of time ($\Delta t$), and then falls suddenly again to zero as indicated by the drop 18—19. Such an impulse has the form of a Dirac delta function and is defined by the expression $$\lim_{\Delta t \to 0}[e_1 \cdot \Delta t] = 1$$

This impulse or Dirac delta function type of input is readily amenable to computation for analytically computing the transient response of a system such as illustrated in Figure 2. The impulse may readily be generated physically by means of a contactor which momentarily applies a voltage to the input terminals 39 of Figure 2. Sufficient precision is attained if the time interval ($\Delta t$) during which the voltage is actually applied is small compared to the period of the highest frequency of interest in the output. The output of the system is taken from terminals 40 of Figure 2.

Figure 4:
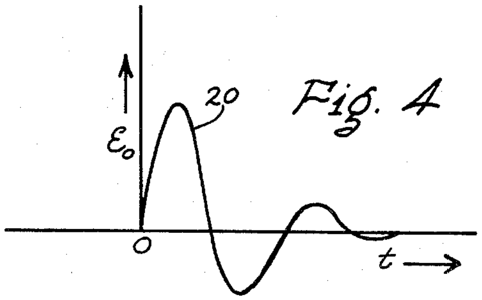
Figure 4 shows a graph of a typical transient response which may be expected from the circuit of Figure 2 as a result of an input impulse similar to that of Figure 3.

Figure 4 shows the type of response which may be expected at the output terminals 40 of a circuit such as that of Figure 2 when an impulse such as that of Figure 3 is applied at its input terminals 39. The ($e_0$) voltage at the output terminals 40 is zero until $t=0$ whereupon the output voltage executes a transient-response curve illustrated by 20 in Figure 4. After a certain length of time the output voltage of course again becomes zero. The character of the curve 20 will depend on the nature of the elements 21, 22, 23, etc. 24 and 25(*a*) or 25(*b*), and on the respective adjustments of sampling circuits 32, 33, 34, etc. 35, and 36($a$) or 36($b$). The curve 20 is termed the impulse response of the network. If a circuit having the impulse-response curve 20 shown in Figure 4 is employed as a seismograph filter, then it is apparent that the character of curve 20 will profoundly affect the type of seismogram obtained when using this particular circuit in the seismograph channel. Those skilled in the seismograph art will recognize that wave trains similar to that shown in Figure 4 are often seen on reflection seismograms when made with the use of filters. In the case of the circuit of Figure 2, the nature of the curve 20 may be varied by varying the adjustment of the sampling circuits 32, 33, 34, etc. 35, and 36($a$) or 36($b$).

It is impractical to attempt to adjust in the field all of the sampling circuits 32, 33, 34, etc. 35, and 36($a$) or 36($b$) shown in Figure 2. The network of Figure 2 is also physically too heavy and complex for routine field operations. However, it is relatively simple to record the seismic impulses in the field with high fidelity so that the resulting seismogram will contain all of the seismic impulses and all of the associated noise. The field seismogram is made in a phonographically-reproducible form, for example on magnetic tape or in the form shown in Rieber Patent No. 2,051,153, so that it may subsequently be played back in the laboratory as often as desired. The play-back means may then include an adjustable filter of the type shown in Figure 2 and the effect of various filter adjustments may then be observed in the laboratory. By observing the output voltage on a cathode-ray oscilloscope during repeated reproduction of the seismogram, the operator can adjust the sampling circuits 32, 33, 34, etc. 35, and 36($a$) or 36($b$) to obtain the best possible reflection-to-noise ratio. The sampling circuits 32, 33, 34, etc. 35, and 36($a$) or 36($b$) are each calibrated beforehand so that the polarity and magnitude of the samples delivered by them at optimum adjustment will be known. Having thus determined the optimum adjustments for the sampling circuits 32–36, it becomes possible to compute an equivalent simpler filter circuit i.e. one which is less complex than that of Figure 2. This simple circuit will reproduce the characteristics which pertain to Figure 2 with optimum adjustment. A check on the solution can be made by comparing the impulse response curve of the computed filter with that of Figure 2 in optimum adjustment. Such a simple filter circuit may thereafter be employed in field operations in the area for which the original seismogram was typical, with the assurance that it will produce seismograms having optimum reflection-to-noise ratio for this area. Each typical area may be similarly investigated and the optimum filter for such area determined.

It is known that an impulse response of the character shown by curve 20 of Figure 4 may be represented by the sum of a series of functions known as Laguerre functions. This may be written as $e_0=\Sigma a_n \cdot l_n(t)$ in which $a_n$ is a coefficient that may be either plus or minus, and $l_n(t)$ is the Laguerre function of degree $n$. Various forms of Laguerre functions have been computed by mathematicians and engineers and their values are known. (See for instance Y. W. Lee, "Synthesis of Electrical Networks by Means of the Fourier Transforms of Laguerre's Functions," Massachusetts Institute of Technology Thesis, 1930, also published in Jour. Math. Phys., vol. II, pp. 83–113, June 1932; P. R. Aigrain and E. M. Williams, "Design of Optimum Transient Response Amplifiers," Proc. I.R.E., vol. 37, pp. 873–879, August 1949; D. Jackson, "Fourier Series and Orthogonal Polynominals," Carus Monograph No. 6, The Math. Assn. of America, Oberlin, Ohio, 1941; G. Szego, "Orthogonal Polynominals," Am. Math. Soc. Coll. Pub., vol. 23, 1939; E. E. Ward, "The Calculation of Transients in Dynamical Systems," Proc. Cambridge Phil. Soc., vol. 50, part I, pp. 49–59, January 1954.)

In this invention the network elements 21, 22, 23, etc. 24, and 25($a$) or 25($b$) are of such form that the impulse responses at the respective points 30($a$), 26, 27, 28, etc. 29, 30($b$) are given by members of a series of Laguerre functions. In this invention only the series of Laguerre functions of the form $e^{-t}L_n(kt)$, where $L_n(kt)$ is a Laguerre polynominal of degree $n$ and $e$ is the base of natural logarithms and $k$ is either 1 or 2, will be considered. In certain embodiments of the invention $k=1$ and in other embodiments $k=2$ as will be indicated. By making the elements 21, 22, 23, etc. 24, and 25($a$) or 25($b$) of this form, the network of Figure 2 becomes amenable to computation whereby a desired impulse response (curve 20 of Figure 4) may readily be accurately matched. The reverse process is also computable, in that the impulse response of a circuit of Figure 2 with a prescribed adjustment of the sampling circuits 32, 33, 34, etc. 35, and 36($a$) or 36($b$) may be computed. Thus by employing network elements 21, 22, 23, etc. 24, 25($a$) or 25($b$) in Figure 2 which have impulse responses corresponding to the Laguerre functions there is obtained a filter circuit completely amenable to analysis by computation. The Laguerre coefficients ($a_n$) are the settings of the sampling circuits 32, 33, 34, etc. 35, and 36($a$) or 36($b$). Therefore, by observing the optimum adjustments for the calibrated sampling circuits 32–36 of Figure 2, the coefficients $a_n$ become known. The operator will thus have the coefficients of the Laguerre series which describes the impulse response of the optimum filter system. Having also a filter system adjusted for optimum filtering the operator can observe its impulse response characteristic. In addition he can make a frequency response test and observe the frequency response characteristic both as to phase and magnitude. From these characteristics the operator may by means of standard techniques design a circuit to match the characteristics which effect optimum filtering. In this manner optimum adjustments in the impulse characteristic of the filter system can be made in the laboratory in order to effect desired improvement in seismic response, and these optimum adjustments can be readily converted to a practical filter for use in the field.

The adjustment of the sampling circuits 32–36 so as to effect the optimum signal-to-noise ratio on the filtered seismogram requires a certain degree of skill on the part of the operator but the process can be carried out by a systematic series of adjustments to the calibrated dials of the sampling circuits. The speed with which the process is carried out may be facilitated if the operator will familiarize himself with the general form and behavior of the terms ($l_n$) of the Laguerre series previously mentioned. Familiarity with the envelope of the Laguerre coefficients ($a_n$ as a function of $n$) which result in commonly-used filter circuits will also be helpful. In addition, a knowledge of the transient response obtained from certain standard combinations of sampling-circuit settings will be found helpful. As a further aid the operator may employ charts showing the frequency response obtained from certain standard combinations of sampling-circuit settings. With these various guidances the adjustment of the sampling circuits to give the best possible filtering in any particular area may be accomplished by an experienced operator in a reasonable length of time.

Figure 5:
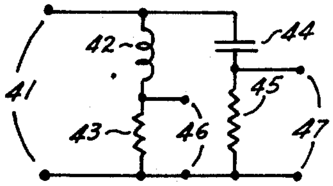
Figure 5 shows a wiring diagram of a circuit element whose operation is helpful in understanding the invention.

In the above-mentioned Ward publication it is shown that the frequency responses of Laguerre functions of the form $e^{-t}\cdot L_n(t)$, $n=0, 1, 2, \ldots$, where $L_n(t)$ is a Laguerre polynominal of degree $n$, are given by $$s^n/(1+s)^{n+1}$$

where $s$ is the usual complex frequency variable and $n$ is a positive integer. The circuit of Figure 5 can be connected in repeated cascade to form a ladder network with this frequency response. An inductance 42 and resistor 43 are connected in series across the input terminals 41. In parallel with these is a condenser 44 and a resistor 45. An output signal may be taken either across resistor 45 as shown by terminals 47 in which case the output-to-input frequency response ratio will be $RCs/(1+RCs)$, or across the resistor 43 as shown by terminals 46 in which case the output-to-input frequency response ratio will be $1/(1+RCs)$. If in the circuit of Figure 5 the values of the separate resistors 43 and 45 and the inductance 42 and the condenser 44 are related by $R^2=L/C$ then the circuit will at all frequencies have an input impedance (as seen at terminals 41) of pure resistance of value R. It is apparent that instead of the resistor 45, one may again substitute an entire network of the type shown in Figure 5, and this may in fact be done ad infinitum. Each such Figure 5 section sees the succeeding network as a pure resistance equal to R and so the frequency response behavior through one section is unaffected by the presence of other sections. Alternatively, instead of resistor 43 one may substitute a network of the type shown in Figure 5, and this substitution may be continued. In this manner it is possible to cascade successive sections of the general type of Figure 5 to obtain a circuit with the frequency response $(RCs)^m/(1+RCs)^n$ where $RC=L/R$ and $m$ and $n$ are positive integers. The sections are chosen to have impulse responses corresponding to Laguerre functions and the impulse response of a number of cascaded sections will correspond to a Laguerre function of known form and degree. Continued substitution in successive sections respectively for resistor 43 or resistor 45 (but always for the same one) gives rise to ladder networks of the type employed in this invention and specific examples of which will now be described.

Figure 6:
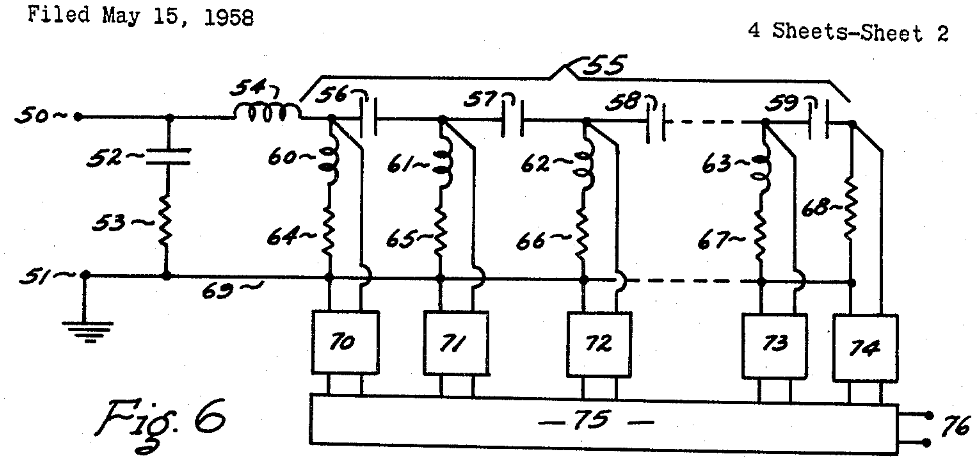

Figure 6 is a detailed wiring diagram illustrating a circuit network that forms one embodiment of this invention. The input terminals 50 and 51 are connected to a source of voltage which for test purposes may be an impulse generator previously described, or in service operation may be the voltage to be filtered. Output terminals 76 are connected for test purposes to a cathode ray oscilloscope, or in service operation to a recorder, amplifier and/or other devices in the electrical channel. Connected between the input terminals 50 and 51 as shown in Figure 6 is a series circuit comprising a condenser 52 in series with a resistor 53. In parallel with this series circuit is a series circuit comprising an inductance 54 in series with a ladder network indicated generally by the bracket 55, the latter comprising the condensers 56, 57, 58, etc. 59, inductances 60, 61, 62, etc. 63, and resistors 64, 65, 66, etc. 67. A terminating resistor 68 is connected across the end of the network. The condenser 52, resistor 53 and inductance 54, form the auxiliary network represented by 25($a$) of Figure 2. The magnitudes of the various components of Figure 6 are related by the equation $R^2=L/C$ where R is the value of the resistance in each branch, L is the value of the inductance in each branch, and C is the value of the capacitance in each branch. A branch is defined as a single path between successive junction points. It is apparent that in the circuit of Figure 6, each of the inductances, except inductance 54, has a resistor connected in series with it, whereby the losses (both core losses and copper losses) in the inductances can easily be taken into account by simply reducing the added resistance in the branch an equivalent amount. The frequency effect of internal resistance in inductance 54 can be compensated for by a shunt resistor of the proper value across the input terminals to sampling circuit 70. The various components are connected as shown in Figure 6 and it is to be understood that the ladder portion indicated generally by bracket 55 may be extended by the introduction of additional similar sections. In order to attain good filter approximations one or two dozen such sections may be desirable. In the circuit of Figure 6 the input terminal 51 is connected to ground as is also one side of the ladder network, so that the lead 69 forms a running ground. This means that the various elements of the ladder sections are always operated at the lowest practical potential above ground whereby the effect of distributed capacity in these elements is minimized.

In Figure 6 the sampling circuits 71, 72, etc. 73 and 74 are connected to the ladder network so as to sample the voltage output of the respective ladder sections, and the sampling circuit 70 is connected to sample the voltage output of the auxiliary circuit which precedes the ladder network. It can be shown analytically that with an impulse input the signal sampled by each of the sampling networks 70–74 corresponds to one of the Laguerre functions of the form $e^{-t}\cdot L_n(t)$ where $L_n(t)$ is the Laguerre polynomial of degree $n$. The sampling circuits 70–74 have calibrated adjustments so that when the sampling circuits are adjusted the respective signal samples transferred will be known both as to polarity and relative magnitude. The sampling circuits 70–74 are connected to deliver their respective signals to a summing circuit 75 which combines algebraically the respective sample signals. The combined output is delivered at terminals 76. In the embodiment of Figure 6 the input terminal 51 may be grounded and the ground lead 69 forms a running ground connection that keeps one side of the ladder network at ground potential. Furthermore one input terminal of each of the sampling circuits 70, 71, 72, etc. 73, 74 is thereby also maintained at ground potential and this further stabilizes the system. The ground connection 69 is highly desirable in that it provides stability to the vacuum-tube circuits employed and it avoids unpredictable capacity and leakage effects that accompany the use of floating circuits. The calibrated sampling circuits 70–74 and the summing circuit 75 are well known elements and will be described later.

In Figure 6, the elements 52 and 53 are in parallel with the rest of the circuit comprising elements 54 and 55. It is apparent that the elements 52 and 53 have no effect on the voltages that are sampled by the sampling circuits 70–74. The elements 52 and 53 serve however to make the network resistive as seen by the generator connected to the terminals 50 and 51. Accordingly if the particular generator that feeds into terminals 50 and 51 does not require a purely resistive load then the elements 52 and 53 may be omitted and such omission will have no effect on the output of the system as delivered to terminals 76.

Figure 7:
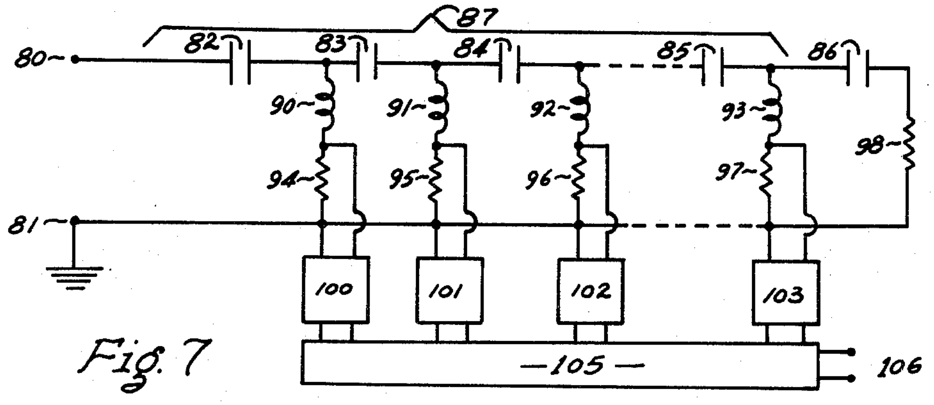

Figure 7 shows a wiring diagram of another embodiment of the invention comprising a ladder network indicated generally by bracket 87 followed by an auxiliary network similar to 25($b$) of Figure 2. Terminals 80 and 81 are input terminals and one side of the input, as for example terminal 81, may be grounded. The ladder network comprises a condenser 82 in series with an inductance 90 and a resistor 94. Across the inductance 90 and resistor 94 is connected a series circuit comprising condenser 83, inductance 91, and resistor 95. Across the elements 91 and 95 there is again connected a condenser 84, inductance 92, and resistor 96. Additional sections may be added to the ladder in similar manner as indicated by the dotted lines, and the last section of the ladder comprises condenser 85, inductance 93, and resistor 97. This ladder network is followed by an auxiliary circuit comprising condenser 86 and resistor 98 connected across the inductance 93 and resistor 97 of the last ladder section. The condensers 82, 83, 84, etc. 85 and 86 all have equal capacity C, the inductances 90, 91, 92, etc. 93 all have equal inductance L, and the resistors 94, 95, 96, etc. 97, and 98 all have equal resistance R, the values being given by the relation $R^2=L/C$. The embodiment of Figure 7 employs the auxiliary network following the ladder and the auxiliary network also forms the termination for the ladder 87. Sampling of each section is taken from across the resistor such as 94, 95, 96, etc. 97 and these voltages are fed to the calibrated sampling circuits 100, 101, 102, etc. 103. The sampling circuits provide known adjustment of both magnitude and polarity of the sampled signal. The outputs of the sampling circuits are algebraically combined in summing circuit 105 whose output is delivered at output terminals 106. The ladder network of Figure 7 when terminated as shown gives a series of voltages across the resistors 94, 95, 96, etc. 97 which correspond respectively to Laguerre functions of the form $e^{-t}\cdot L_n(t)$ where $L_n(t)$ is the Laguerre polynomial of degree $n$. Knowing the magnitude and sign of each of the sampling coefficients ($a_n$) as determined by the setting of the respective sampling circuits, the circuit of Figure 7 is amenable to computation both as to transient response and as to equivalent filter characteristics. The circuit of Figure 7 is advantageous in that each inductance is in series with a resistor, so that losses in the inductances may be accounted for in setting up the resistor of each branch to the proper value, namely, $R^2=L/C$. This means that this circuit may be set up to meet theoretical conditions to a high degree of precision. The fact that the samples are not taken across all of the equivalent resistance in the respective inductance plus resistance branches is easily taken into account in calibrating the sampling circuits 100–103. The ground on terminal 81 also provides stability as previously mentioned.

Figure 8:
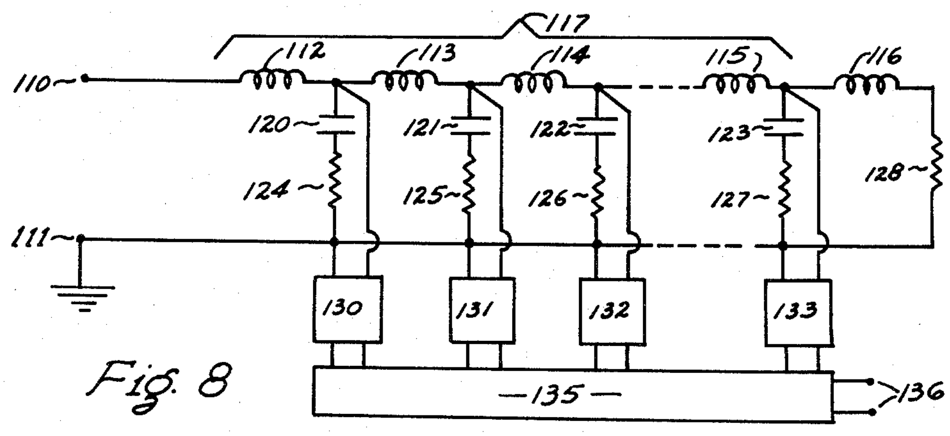

Another circuit which may be employed in this invention is shown in Figure 8. This circuit is similar to that of Figure 7 except that it has the condensers and inductances interchanged, and sampling is done across the condenser and resistor rather than across the resistor alone as in Figure 7. The input terminals are 110 and 111 of which 111 may be grounded. Each ladder section comprises an inductance such as 112 in series with a condenser such as 120 and a resistor 124. Across the condenser 120 and resistor 124 there is connected an inductance 113 in series with a condenser 121 and resistor 125. Across the condenser 121 and resistor 125 there is again connected an inductance 114 in series with a condenser 122 and a resistor 126. This may be continued until the final section of the ladder is reached having inductance 115, condenser 123, and resistor 127. This much of the circuit comprises the ladder network indicated by the bracket 117. The auxiliary network is connected to follow the end of the ladder 117 and comprises inductance 116 and resistor 128. The auxiliary network also forms the termination. The inductances 112, 113, 114, etc. 115 and 116 all have equal inductance L, the condensers 120, 121, 122, etc. 123 all have equal capacity C, and the resistors 124, 125, 126, etc. 127 and 128 all have equal resistance R, the values being given by the relation $R^2=L/C$. Samples from each of the ladder sections are taken from across the condenser and the resistor as shown in Figure 8 and fed respectively to the calibrated sampling circuits 130, 131, 132, etc. 133. The sample voltages adjusted as to known magnitude and polarity are algebraically combined by the summing circuit 135 and the sum delivered to the output terminals 136. The behavior of this circuit can also be computed, but it does not meet the requirements of Laguerre functions, and the computations are much more lengthy and cumbersome because the functions describing the behavior of this circuit are not orthogonal as are the Laguerre functions. When this circuit is employed it is necessary to compute the coefficients ($a_n$) from a set of simultaneous equations involving the settings of the sampling circuits 130–133. Accordingly this circuit is not as advantageous as those of Figures 6 or 7. However, the circuit of Figure 8 has a running ground (from terminal 111) in the manner similar to Figures 6 and 7.

A still further embodiment of this invention is illustrated in Figure 9. The network of Figure 9 shows a different type of ladder than the previously-described embodiments in that it comprises a series of vacuum tubes indicated by the bracket 147. The ladder is preceded by an auxiliary network comprising inductance 142 and resistor 143 connected as shown to input terminals 140 and 141 of which 141 may be grounded. Inasmuch as the succeeding sections of the ladder network 147 are entirely similar only one of them will be described. Each section comprises a vacuum tube 144 which is indicated as a triode but other multi-element tubes connected for triode operation may be employed. By way of example, one unit of a type 12AU7 tube has been found satisfactory as tube 144. The input of the section is connected to the grid of tube 144. The plate circuit of the tube comprises resistor 145 and the cathode circuit comprises resistor 146. Plate voltage supply is connected as indicated at the B+ terminals. The anode (plate) resistor 145 is made equal to the cathode resistor 146 in each section, but their value need not necessarily be the same as that of similar resistors in each of the other ladder sections. By way of example, resistors 145 and 146 may each be 1000 ohms. A series circuit comprising condenser 148 and resistor 149 is connected from the plate to the cathode of tube 144. Output signal of each section is taken from the junction between condenser 148 and resistor 149. The value of the condenser and resistor is chosen so that for all sections the product $RC$=constant, where R is the resistance of resistor 149 and C is the capacity of condenser 148. It is not necessary that the resistors 149 be the same in all sections or that the condensers 148 be the same in all sections, provided only that their product RC is the same for all sections. By way of example, a capacity of 0.005 mfd. for condenser 148 and a resistance of 1 megohm for resistor 149 have been found satisfactory for operations with seismic signals. The value of the inductance 142 and the resistor 143 of the auxiliary circuit are such that $L/R=RC$=constant. A sample voltage is taken from across the resistor 143 of the auxiliary network and fed to the calibrated sampling circuit 150. Voltage is sampled from each section of the ladder network from the junction between the condenser 148 and the resistor 149 as shown in Figure 9 by calibrated sampling circuits 151, 152, etc. 153. The sampled signals are adjusted in polarity and amplitude by known amounts in the calibrated sampling circuits. The outputs of all of the sampling circuits 150–153 are combined algebraically by summing circuit 155 and delivered at terminals 156.

In the above-mentioned Ward publication it is shown that the frequency responses of Laguerre functions of the form $e^{-t}\cdot L_n(2t)$, $n=0, 1, 2, \ldots$, where $L_n(2t)$ is a Laguerre polynomial of degree $n$, are given by $$(1-s)^n/(1+s)^{n+1}$$

where $s$ is the usual complex frequency variable and $n$ is a positive integer. Ward as well as Aigrain and Williams (ref. cit.) point out the computational advantages of this form of Laguerre functions. The frequency response of the tube circuit comprising elements 144, 145, 146, 148, and 149 of Figure 9 is $(1-RCs)/(1+RCs)$. In this invention a series of such tube circuits are cascaded in a ladder network with the proper initial section in order to obtain the desired Laguerre function impulse response. The circuit of Figure 9 is advantageous in that it has but one inductance. An amplifier such as 160, 161, etc. is connected in each ladder section in order to supply energy and make up for attenuation in the tube 144 of the section. The amplifiers 160, 161, etc. are conventional single-stage repeater circuits and are shown only schematically in Figure 9 and will be described in detail later. The amplifiers are tied into the running ground 141 and also provide in their output circuit means for tieing down the grid of the succeeding tube as will become evident later in the detailed explanation of Figure 17. The adjustment of amplifiers 160, 161, etc. will be explained later.

Figure 10 shows another embodiment of this invention in which a tube-type ladder network 167 is employed. Input terminals are 170 and 171 of which 171 may be grounded. The auxiliary circuit comprises resistor 172 and condenser 173. The voltage across the condenser 173 is sampled by calibrated sampling circuit 180. The tube-type ladder network 167 employing triode tubes such as 174 is in all respects similar to that of 147 of Figure 9. In Figure 10 the anode resistor 175 of tube 174 is made equal to the cathode resistor 176 in each section, but their value need not necessarily be the same as that of similar resistors in each of the other ladder sections. The product of the capacity (C) of condenser 178 and the resistance (R) of resistor 179 is the same for each section and also equal to the product RC for resistor 172 and condenser 173 of the auxiliary network. Sample voltages are taken from the various sections of the ladder 167 by means of calibrated sampling circuits 181, 182, etc. 183. The outputs of the sampling circuits 180–183 are adjusted as to known amplitude and known polarity and are algebraically combined by summing circuit 185 and delivered to the output terminals at 186. The impulse responses of the circuit of Figure 10 at the sampling points can also be shown to correspond to Laguerre functions of the form $e^{-t} \cdot L_n(2t)$, where $L_n(2t)$ is a Laguerre polynomial of degree $n$. The circuit is particularly advantageous in that no inductances are employed. Condensers can usually be made highly efficient so that it is possible with the circuit of Figure 10 to set up the theoretically-required conditions to a high degree of precision. Inasmuch as terminal 171 is grounded, each section of the ladder as well as the sampling circuits are provided with a high degree of stability. In order to compensate for attenuation in the tubes 174 of the ladder network amplifiers such as 187, 188, etc. are included in each ladder sections in a manner similar to Figure 9. The gain of amplifiers 187, 188, etc. is adjusted to provide the proper compensation as will be described.

In the embodiment of Figure 10 the grid potential of tube 174 must be tied down through the input circuit connected to input terminals 170 and 171. A high grid leak resistance may be connected in parallel with condenser 173. The values of the grid leak resistor, resistor 172 and condenser 173 must be such that the parallel combination of the two resistors and the condenser must have the same RC product as condenser 178 and resistor 179. Some attenuation does occur in this circuit.

A preferred embodiment of the invention is shown in Figure 11, in which the ladder network 247 is in all respects similar to the ladder network 147 and 167 of Figures 9 and 10. The auxiliary circuit which precedes the ladder network 247 comprises an integrator 254 connected to the input terminals 240 and 241 of which the latter may be grounded as shown. The integrator 254 is conventional and will be described in detail later. In series with the integrator is a condenser 242 having a capacity (C) and a resistor 243 having a resistance (R) connected as shown. The circuit comprising the integrator 254, condenser 242 and resistor 243 can be shown to produce across resistor 243 an impulse response that corresponds to a Laguerre function of the form $$e^{-t} \cdot L_0(2t)$$

where $L_0(2t)$ is the Laguerre polynomial of degree zero. The ladder network 247 is connected across the resistor 243 as shown. Each section of the ladder comprises a tube 244 having cathode resistor 246 and anode resistor 245. The anode resistor 245 is made equal to the cathode resistor 246, but their value need not necessarily be the same as that of similar resistors in each of the other ladder sections. From anode to cathode there is connected a series circuit comprising condenser 248 and resistor 249. The product of the capacity (C) of condenser 248 and the resistance (R) of resistor 249 is the same for each ladder section and is also equal to the RC product for condenser 242 and resistor 243. The junction between condenser 248 and resistor 249 is connected to an amplifier whose gain is adjusted to compensate for attenuation in the circuit of tube 244 as will be described. It can be shown that the circuit of Figure 11 will produce at the end of each ladder section (comprising the circuit of a tube 244 and an amplifier 260) an impulse response that corresponds to a Laguerre function of the form $e^{-t} \cdot L_n(2t)$ where $L_n(2t)$ is the Laguerre polynomial of degree $n$. The voltage across resistor 243 of the auxiliary circuit is sampled by the calibrated sampling circuit 250, and the output voltages of the respective ladder sections are sampled by the calibrated sampling circuits 251, 252, etc. 253. The outputs of the sampling circuits are adjusted as to known amplitude and known polarity with respect to their respective input signals and algebraically combined by summing circuit 255 and delivered to the output terminals 256. It is seen that the circuit of Figure 11 has a running ground which provides the necessary stability, it employs no inductances whereby very high precision can be attained, and the grid of tube 244 is provided with a grid resistor. The resistors 246 and 249 together form the grid resistor for the tube in the succeeding amplifier 260 as will become evident later. The circuit of Figure 11 is the preferred embodiment of the invention.

Figure 11 has a further practical advantage. The impulse response of the networks of this invention is determined by applying to the input terminals in each case a signal like that of Figure 3. However in the case of Figure 11, the same result can alternatively be obtained by applying to terminal 257 a well-known step function input. No special apparatus is required to produce a step function input and this simplifies this test when using the circuit of Figure 11.

Figures 12 and 13 show examples of sampling circuits which may be employed with any of the embodiments of this invention. The sampling circuits are known and do not per se form the subject matter of this invention. Inasmuch as one terminal of each ladder section and also of each auxiliary circuit is grounded, the sample voltage is in each instance taken with respect to this ground. It is accordingly highly desirable to maintain a ground in the sampling circuits.

In the sampling circuit of Figure 12 the voltage to be sampled is applied at terminals 190 one of which is grounded as shown at 189. The sample voltage is passed through a transformer 191 which preferably is of a type having high fidelity at the frequencies of interest in the particular problem being studied. For example, in the case of seismic operations the frequency response of the transformer 191 should be substantially flat from about 3 to about 300 c.p.s. The secondary of transformer 191 is connected to a reversing switch 192 and to the ends of a calibrated potentiometer 193. By means of the potentiometer slider 194 any known fraction of the transformer secondary voltage may be tapped off and its polarity may be made to have the desired value by appropriate manipulation of the reversing switch 192. The potentiometer slider 194 is calibrated to show the fraction of the voltage at terminals 190 that is delivered at terminals 195. The impedance of the circuit of Figure 12 as seen at terminals 190 should be high compared to that of the network to which it is connected. The adjusted sample voltage is delivered at terminals 195 and it is apparent that one of these terminals may be grounded if desired.

Figure 13 shows another known type of sampling circuit which employs a vacuum tube 196. The input, i.e., the signal to be sampled, is applied at terminals 197, one of which may be grounded as shown at 206 in Figure 13. The ungrounded terminal is connected to the grid of tube 196 and to a grid resistor 198. The resistance of grid resistor 198 should be high compared to the impedance of the network to which the input terminals 197 are connected and may be of the order of 1 megohm. The cathode of tube 196 has a resistor 199 and the anode has a resistor 200 whose resistance value is the same as resistor 199. Resistors 199 and 200 may for example each have a resistance of 5000 ohms. Plate voltage is supplied at the terminal marked B+. The output of tube 196 may be taken either from the cathode or the anode. Tube 196 may be a triode as for example one unit of a type 12AU7 tube or may be some other type in which an equivalent triode connection is employed. Inasmuch as the same tube current flows through resistor 199 as flows through resistor 200, the output may be taken either from the cathode or the anode and these two voltages differ only in sign. Accordingly, a single-pole double-throw switch 201 is provided so that the sample voltage may be made to have the desired polarity. A decoupling network comprising condenser 202 and potentiometer 203 is connected as shown in order to isolate the output terminal 204. The decoupling network must not attenuate frequencies of interest and, for example, condenser 202 may have a capacity of 2 mfd. and potentiometer 203 may have a resistance of 1 megohm. The circuit of Figure 13 may be made to operate at frequencies as low as desired by proper design of the time constant attained by condenser 202 and potentiometer 203. It is apparent that in the circuit of Figure 13 one of the output terminals 204 is necessarily grounded. The magnitude of the output voltage delivered at terminals 204 is determined by the adjustment of the potentiometer slider 205 and its polarity is determined by the setting of the switch 201.

In calibrating the sampling circuit of either Figure 12 or Figure 13, the potentiometer slider (194 or 205 respectively) is calibrated in conjunction with the rest of the respective sampling circuit to indicate the fraction of the voltage at terminals 190 or 197 respectively that is delivered by the sampling circuit to terminals 195 or 204 respectively. It is essential that all of the sampling circuits connected to the particular network employed be accurately calibrated with respect to each other. Such calibration may easily be made by applying a steady A.-C. signal of frequency with the range of frequencies of interest to the separate sampling circuits and employing a vacuum tube voltmeter to compare the input and output voltages at various settings of the potentiometer (194 or 205) in well-known manner.

The circuit employed for algebraically combining the outputs of the sampling circuits will depend on the type of sampling circuits employed. It is apparent that if the sampling circuit of Figure 12 is used, and no ground is placed on the secondary of transformer 191, the combination of outputs of such circuits may be obtained by simply connecting the output terminals 195 (Figure 12) in series. Figure 14 shows such a circuit in which the various adjusted sample voltages (obtained from the sampling circuits such as Figure 12) are applied to terminals 225, 226, 227, etc. 228. The individual voltages are summed algebraically by the series circuit and the sum is delivered to output terminals 230. On the other hand if the sampling circuit of Figure 13 is employed, the output circuits may be connected in parallel as shown in Figure 15. In Figure 15 the terminals 210, 211, 212, etc. 213 are connected to the output of the respective sampling circuits i.e., terminals 204 of Figure 13. One of each of the terminals 210–213 may be grounded as shown at 214, and of course this corresponds to the grounded terminal (206) of the respective pairs 204 of Figure 13. Each of the other terminals is connected to a separate high impedance load resistor 215, 216, 217, etc. 218. The other terminals of the resistors 215–218 are connected to a common lead 220 which is connected through a common resistor 221 to ground. The resistors 215–218 are made to have a high impedance with respect to the resistor 221 (as well as with respect to potentiometer 203 of Figure 13) and the resistors 215–218 are all made equal. By way of example, the resistors 215–218 may each have a resistance of 1 megohm or higher, whereas the resistance of resistor 221 may be in the order of 1000 ohms. It is apparent that the current in resistor 221 is the sum of the currents in resistors 215–218, and since resistors 215–218 are all equal, the potential across resistor 221 will be proportional to the sum of the voltages applied to the terminals 210–213. This voltage may be amplified by means of an amplifier 222 and delivered to the output terminals 223. The gain of amplifier 222 is adjusted to compensate for the attenuation that results from the series connection of resistors 215–218 respectively and the resistor 221. By way of example if resistors 215–218 are 1 megohm and resistor 221 is 1000 ohms, then the gain of amplifier 222 should be 1000. The system including amplifier 222 is calibrated so that the voltage delivered at terminals 223 will be the algebraic sum of the voltages delivered to the terminals 210–213.

Figure 16 shows a wiring diagram of the integrator 254 of Figure 11. The integrator of Figure 16 is well known in the art. The input terminals of the integrator are 270 and 271, which correspond to terminals 240 and 241 respectively of Figure 11. The output terminals of the integrator are 280 and 281 which correspond to terminals 257 and 241 respectively of Figure 11. Terminals 271 and 281 may be grounded and this conforms to the running ground 241 of Figure 11. A resistor 272 is connected in series with a condenser 273 between input terminal 270 and output terminal 280. The condenser 273 is bridged by a direct-current amplifier 274, one side of which may be grounded. It can be shown that the circuit of Figure 16 delivers at terminals 280–281 a signal that is the time integral of the signal applied to terminals 270–271. In order to achieve fidelity in the integration the time constant (RC) of the combination of resistor 272 and condenser 273 multiplied by the amplifier gain should be large compared to the period of the longest frequencies of interest. By way of example, values of 1 megohm and 0.01 mfd. respectively have been found adequate for operations on seismic impulses. The gain of amplifier 274 is not critical and may for example be in the neighborhood of 30,000.

Figure 17 shows a detailed wiring diagram of an amplifier which may be employed in any of the embodiments of Figures 9, 10, or 11 as the element indicated by 160, 161, 187, 188, 260, or 261. The amplifier comprises an amplifying device such as tube 283 which may be a triode, as for example one unit of a type 12AU7 tube. One input terminal 285 and one output terminal 291 of the amplifier may be grounded as shown. Inasmuch as this ground is conventional it is not shown on the Figures 9, 10, and 11. The other input terminal 284 is connected to the grid of tube 283. The grid potential is tied down by the resistors in the preceding tube section, namely 146 and 149 of Figure 9, 176 and 179 of Figure 10, 246 and 249 of Figure 11. A cathode resistor 287 connects the cathode of tube 283 to ground. The resistance of resistor 287 may be of the same order as the cathode resistor in the preceding tube stage. A value of 3300 ohms for the resistor 287 has been found adequate. The plate of tube 283 is connected to the B-voltage supply through plate resistor 286 whose value is made much larger than the resistance of resistor 287 and which is preferably made adjustable. A value of about 7000 ohms for resistor 286 has been found satisfactory. The amplified signal is transmitted to the grid of the tube in the succeeding ladder section through a decoupling network comprising a condenser 288 having capacity (C) in series with a resistor 289 having resistance (R) connected from the plate of tube 283 to ground. The CR product for condenser 288 and resistor 289 is made very large compared to the CR product for condenser and resistor in the preceding tube circuit, i.e. large compared to CR for elements 148 and 149 of Figure 9, elements 178 and 179 of Figure 10, and elements 248 and 249 of Figure 11. Inasmuch as the circuit of Figure 17 must be capable of good frequency response to very low frequencies i.e. lower than the lowest frequency of interest in the signal to be analyzed, it is preferred that the CR product be very large. A capacity of 2 mfd. for the condenser 288 and a resistance of 0.5 megohm for the resistor 289 has been found satisfactory for operations in seismic frequency of range. The values given for the various components of Figure 17 are by way of example only, and these will result in an amplifier having substantially flat response down to a frequency of about 1 cps.

In each of the circuits Figures 9, 10 and 11 it will be apparent that a certain amount of attenuation will occur in the tubes 144, 174, or 244 respectively and the purpose of the immediately-succeeding amplifiers 160, 187, or 260 respectively, which may be of the form shown in Figure 17, is to restore the signal to its original amplitude. Accordingly the amplification of the respective amplifiers 160, 161, 187, 188, 260, 261, etc. is adjusted to provide in each ladder section the proper amplification. The amplification of the amplifier of Figure 17 may be adjusted in any one of a variety of conventional ways, as for example by adjustment of the plate resistor 286. Inasmuch as the tubes 144, 174, and 244 may vary slightly in the respective sections of the ladder networks, each ladder section is adjusted individually. The gain of the amplifier is adjusted so that there is no net attenuation through the section, i.e. so that the voltage output of the amplifier 160 for example is the same as the voltage input to the grid of the preceding tube 144. These adjustments may be made by applying a steady A.-C. signal of frequency within the range of frequencies of interest to the input of the respective ladder sections and adjusting the gain of each amplifier (e.g. by adjusting resistor 286 of Figure 17) so that the output of the section is equal to the input as measured with a vacuum-tube voltmeter. Best precision is attained if this adjustment is made without disconnecting the respective ladder sections or the respective sampling circuits which load the amplifier slightly and therefore may affect its gain.

By using the filter networks of this invention the coefficients ($a_n$) of a Laguerre series characterizing the filter are read off the calibrated adjustments of the sampling networks directly. It is to be noted that the Laguerre series for the circuits of Figures 6 and 7 differ from that of Figures 9, 10, and 11. Each however has certain advantages. Figures 6 and 7 have a minimum of vacuum tubes which may be an advantage in certain applications. On the other hand Figures 9, 10, and 11 have the advantage of greater computational flexibility and permit the introduction of amplifiers to compensate attenuation down the extended ladder network so that a greater number of sections may be used with corresponding increase in precision. The circuits of this invention, by directly indicating the Laguerre coefficients, permit the operator to quickly arrive at the characteristics of an optimum filter for recording transient phenomena when accompanied by noise or other extraneous vibrations.

In the circuits of Figures 9, 10, and 11 the condensers 148, 178, 248 respectively and the resistors 149, 179, 249 respectively may be interchanged and this results merely in changing the sign of the Laguerre terms of odd degree (i.e. those for which $n$ is odd) in the Laguerre series characterizing the filter. It is apparent, however, that such an interchange in the circuit will require that means be provided for blocking plate voltage of tubes 144, 174, 244 respectively from the grid of the next tube i.e. the tube of amplifiers 160, 187, 260 respectively, and will also require means for tieing down the grid of the next tube.

While the filter circuits of this invention have been described with particular reference to seismic recording, this is merely by way of example and other uses will be evident to those skilled in the art. Furthermore, whereas the described purpose of the filter circuits of this invention is to obtain the Laguerre coefficients of an optimum filter so that further analyses and computations can readily be made, it is apparent that if desired the circuits herein disclosed and claimed may be employed as adjustable filters without necessarily using the Laguerre coefficients so obtained.

What I claim as my invention is:

1. An adjustable electrical filter circuit comprising a pair of input terminals, a series branch consisting of two equal inductances L and resistance R connected between said input terminals, a plurality of circuit branches each consisting of capacitance C and inductance L and resistance R in series, said circuit branches being connected in cascade so that the first branch is connected in parallel with one of said first-named inductances and said first-named resistance, and each succeeding branch is connected in parallel with the inductance and resistance of the preceding branch, a circuit branch consisting of a capacitance C and resistance R in series connected in parallel with the inductance and resistance of the last of said cascaded branches, whereby each of said resistances has a common terminal connected to one of said input terminals, the magnitude of each of said inductances L and capacitances C and resistance R being related by the expression $R^2=L/C$, a plurality of electrical connections leading to separate respective junctions of said branches with a preceding branch whereby the instantaneous voltages at said junctions may be sampled, a plurality of voltage-adjusting means connected to said connections respectively developing instantaneous voltages related to said voltages in known polarity and known amplitude, and means connected to a plurality of said voltage-adjusting means algebraically summing the signals thereof.

2. An adjustable electric filter circuit comprising a pair of input terminals, a plurality of circuit branches each consisting of a capacitance C and inductance L and resistance R connected in series, said circuit branches being connected in cascade so that the first branch is connected to said input terminals and each succeeding branch is connected in parallel with the inductance and resistance of the preceding branch, a terminating branch consisting of a capacitance C and a resistance R in series connected in parallel with the inductance and resistance of the last of said cascaded branches, whereby each of said resistances has a common terminal connected to one of said input terminals, the magnitude of each of said inductances L and capacitances C and resistances R being related by the expression $R^2=L/C$, a plurality of electrical connections leading to terminals of respective resistances in said first-named branches whereby the instantaneous voltages across said resistances may be sampled, a plurality of voltage-adjusting means connected to said connections respectively developing instantaneous voltages related to said voltages in known polarity and known amplitude, and means connected to a plurality of said voltage-adjusting means algebraically summing the signals thereof.

3. An adjustable electric filter circuit comprising a pair of input terminals, a plurality of circuit branches each consisting of an inductance L and capacitance C and resistance R connected in series, said circuit branches being connected in cascade so that the first branch is connected to said input terminals and each succeeding branch is connected in parallel with the capacitance and resistance of the preceding branch, a terminating branch consisting of an inductance L and a resistance R in series connected in parallel with the capacitance and resistance of the last of said cascaded branches, whereby each of said resistances has a common terminal connected to one of said input terminals, the magnitude of each of said inductances L and capacitances C and resistances R being related by the expression $R^2=L/C$, a plurality of electrical connections leading to separate respective junctions of said branches with a preceding branch and to the junction of said terminating branch with its preceding branch whereby the instantaneous voltages at said junctions may be sampled, a plurality of voltage-adjusting means connected to said connections respectively developing instantaneous voltages related to said voltages in known polarity and known amplitude, and means connected to a plurality of said voltage-adjusting means algebraically summing the signals thereof.

4. An adjustable electric filter circuit comprising a pair of input terminals, a ground connection to one of said input terminals, an inductance L and a resistor R connected in series from said ungrounded input terminal to said grounded input terminal, an electrical connection to the junction of said resistor and said inductance, a plurality of vacuum-tube circuits each consisting of a vacuum tube having a grid and anode and cathode, a cathode resistor connecting said cathode to said ground connection, an anode resistor connected to said anode, said cathode resistor and said anode resistor having equal resistance, a condenser C and a resistor R connected in series from said anode to said cathode, the magnitude of each of said inductances L and said resistors R and said condensers C being related by the expression $L/R=CR$ =constant, an electrical connection to the junction of said condenser C and said resistor R, the first of said vacuum-tube circuits having its grid connected to the junction of said first-named inductance L and resistance R, means connecting the grid of each of the other of said vacuum-tube circuits in cascade to the junction of said last-named condenser C and resistor R of the preceding circuit, a plurality of electrical connections leading respectively to the junctions of said last-named condenser C and resistor R of said vacuum-tube circuits, a plurality of voltage-adjusting means connected to said connections respectively developing voltages related to said voltages in known polarity and known amplitude, and means connected to a plurality of said voltage-adjusting means algebraically summing the signals thereof.

5. An adjustable electric filter circuit comprising a pair of input terminals, a ground connection to one of said input terminals, a resistor R and a condenser C connected in series from said ungrounded input terminal to said grounded input terminal, an electrical connection to the junction of said resistor and said condenser, a plurality of vacuum-tube circuits each consisting of a vacuum tube having a grid and anode and cathode, a cathode resistor connecting said cathode to said ground connection, an anode resistor connected to said anode, said cathode resistor and said anode resistor having equal resistance, a condenser C and a resistor R connected in series from said anode to said cathode, the magnitude of each of said condensers C and said resistors R being related by the expression $CR$=constant, an electrical connection to the junction of said condenser C and said resistor R, the first of said vacuum-tube circuits having its grid connected to the junction of said first-named resistor R and condenser C, means connecting the grid of each of the other of said vacuum tube circuits in cascade to the junction of said last-named condenser C and resistor R of the preceding circuit, a plurality of electrical connections leading respectively to the junction of said last-named condenser C and resistor R of said vacuum-tube circuits, a plurality of voltage-adjusting means connected to said connections respectively developing voltages related to said voltages in known polarity and known amplitude, and means connected to a plurality of said voltage-adjusting means algebraically summing the signals thereof.

6. An adjustable electric filter circuit comprising a pair of input terminals, a ground connection to one of said input terminals, an electric signal integrator connected to said input terminals and having one ungrounded output terminal, a condenser C and a resistor R connected in series from the ungrounded output terminal of said integrator to ground, an electrical connection to the junction of said resistor and condenser, a plurality of vacuum-tube circuits each consisting of a vacuum tube having a grid and anode and cathode, a cathode resistor connecting said cathode to said ground connection, an anode resistor connected to said anode, said cathode resistor and said anode resistor having equal resistance, a condenser C and a resistor R connected in series from said anode to said cathode, the magnitude of each of said condensers C and said resistors R being related by the expression $RC$=constant, an electrical connection to the junction of said condenser C and said resistor R, the first of said vacuum-tube circuits having its grid connected to the junction of said first-named condenser C and resistor R, means connecting the grid of each of the other of said vacuum-tube circuits in cascade to the junction of the last-named condenser C and resistor R of the preceding circuit, a plurality of electrical connections leading respectively to the junction of said last-named condenser C and resistor R of said vacuum-tube circuits, whereby the instantaneous voltage at said junctions may be sampled, a plurality of voltage-adjusting means connected to said connections respectively developing voltages related to said voltages in known polarity and known amplitude, and means connected to a plurality of said voltage-adjusting means algebraically summing the signals thereof.

References Cited in the file of this patent

UNITED STATES PATENTS

| | | |
|---|---|---|
| 2,263,376 | Blumlein et al. | Nov. 18, 1941 |
| 2,790,956 | Ketchledge | Apr. 30, 1957 |
| 2,823,303 | McCoy | Feb. 11, 1958 |